Figure 1:
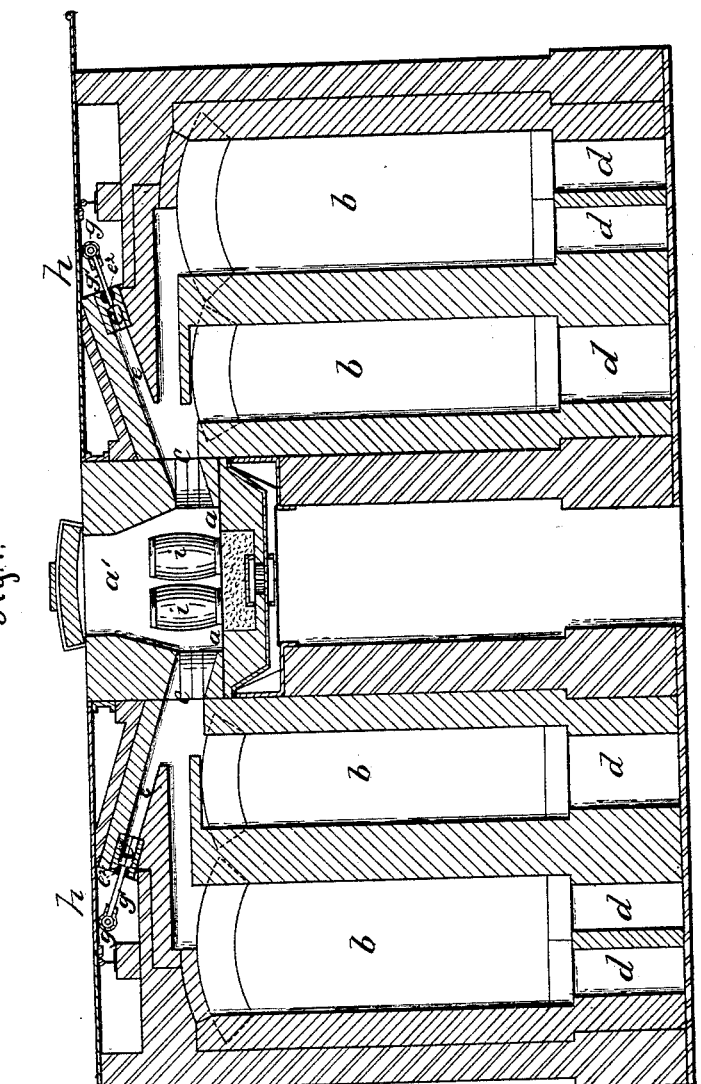

(No Model.)

2 Sheets—Sheet 1.

W. SWINDELL.
GAS FURNACE.

No. 327,618. Patented Oct. 6, 1885.

Witnesses
W. B. Corwin
J. A. Burns.

Inventor
William Swindell
by his attys
Bakewell & Kerr (No Model.) 2 Sheets—Sheet 2.
W. SWINDELL.
GAS FURNACE.
No. 327,618. Patented Oct. 6, 1885.
Fig. 2.
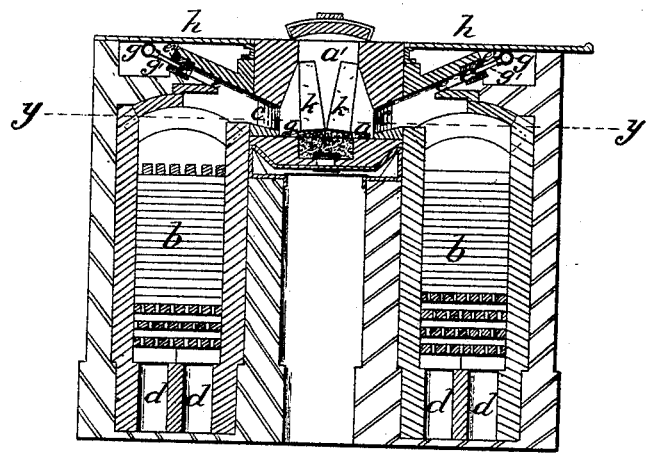
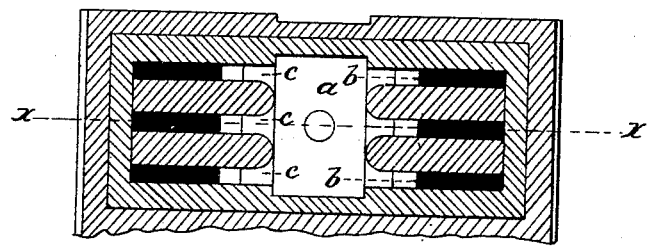
Fig. 3.
Witnesses
W. B. Corwin
J. A. Burns.
Inventor
William Swindell
by his attys
Bakewell & Kerr

UNITED STATES PATENT OFFICE.

WILLIAM SWINDELL, OF ALLEGHENY, PENNSYLVANIA.

GAS-FURNACE.

SPECIFICATION forming part of Letters Patent No. 327,618, dated October 6, 1885.

Application filed August 7, 1884. Serial No. 139,858. (No model.)

*To all whom it may concern:*

Be it known that I, WILLIAM SWINDELL, of the city of Allegheny, in the county of Allegheny and State of Pennsylvania, have invented a new and useful Improvement in Gas-Furnaces; and I do hereby declare the following to be a full, clear, and exact description thereof.

It has been found to be the better practice in the use of regenerator-furnaces using manufactured gas to introduce the air into the bed over the gas, so that its greater gravity may cause it to settle down through the gas, and thus become more perfectly mixed therewith; but I have found, in the use of natural gas or purified gas with pot, ingot, and similar furnaces, that this manner of introducing the gas is objectionable, for the reason that the flame produced by the union of the air and gas in the bridge-flue cuts or melts down and destroys the gas ports and pots, and in some instances allows their charge to escape into the bed. My invention therefore consists in a new method of supplying natural, purified, or other light gas to pot and similar furnaces. In the use of such gas practical experience has demonstrated that the best results are obtained by mingling with the gas a volume of heated air relatively enormously greater than the volume of gas, which air should be as highly heated as possible before being brought into contact with the gas. I have discovered that very beneficial results follow from a construction of gas-delivery flue which permits the expansion of the volume of gas as it approaches the heated portions of the furnace. My present invention relates particularly to such a construction and arrangement of the air and gas flues with the furnace as will bring the air and gas to the throat or bridge of the bed in a proper condition to obtain the beneficial results mentioned.

To enable others skilled in the art to make and use my improvement, I will now describe it by reference to the accompanying drawings, in which—

Figure 1 is a vertical cross-section of a crucible-furnace. Fig. 2 is a like view of an ingot-heating furnace on the line $x\ x$ of Fig. 3, and Fig. 3 is a plan view of the bed on the line $y\ y$ of Fig. 2.

Like letters of reference indicate like parts wherever they occur.

The furnace has a bed, $a$, double air-heating regenerator-chambers $b$, bridge-flues $c$, and flues $d$, which lead to the usual reversing-valve, by which the chamber, $b$ are alternately thrown into and out of connection with the air-inlet and stack flues, which are customary in reversing regenerator-furnaces. The construction of the air-inlet and waste or stack flues and reversing-valve being the usual one, it is unnecessary to describe them in detail.

Entering the flues $c$ diagonally at or near the inner ends of the same are the gas-flues $e$, one over each air-flue $c$, and at the rear end of these flues or conduits $e$ is a hollow brick or tile, $e'$, preferably made in halves for convenience in molding, having a narrow opening at its rear end of sufficient size to receive the branch pipe $g'$, of the gas-pipe $g$, and at the front end an expanded mouth, $e^3$, of considerably greater diameter than the bore of the service or branch pipe $g'$. In the inner side of the socket which receives the end of the pipe $g'$ is an annular recess, $e^2$, of chambered concave, or similar shape, so as to extend beyond the line or face of the socket which is designed to receive a luting or packing of clay, cement, or other suitable material. Owing to the chambered shape of the recess $e^2$, the packing will be retained in place in the nozzle in contact with the sides of the pipe, notwithstanding the expansion or contraction of the parts, and a much better and more reliable joint is obtained than is possible where a straight-sided socket is used.

The main pipes $g$ extend one on each side along under the floor $h$, and have a branch, $g'$, for each conduit $e$. The pipes $g$ are controlled by suitable valves.

By this construction I am able to supply the gas over the heated air from the regenerators $b$, and to so direct it that it strikes the sides of the pots $i$, before it is completely mingled with the air, whereby I prevent the full force of the flame of complete combustion striking the pots when under the influence of the draft, and cause such complete combustion to take place in the chamber $a'$, and thus secure an equal, but more evenly-distributed heat and less cutting action.

The enlarged or expanded mouth $e^3$ of the nozzle pieces or bricks $e'$ afford a space for the expansion of the gas as it emerges from the end of the branch pipe $g'$, while the flues $e$, which are relatively of considerably greater diameter than the pipes $e'$, enable the gas to be supplied at or near the bridge-wall flue in an expanded volume, the condition of which insures its more perfect mixture with the heated air coming from the regenerators.

In the ingot-heating furnace shown in Fig. 2 there is but one regenerator-chamber $b$ on each side. The same advantage is obtained in an ingot-heating furnace as in a pot-furnace— viz., the protection of the walls at the mouth of the flues $c$, and particularly of the upper side or arch, and the even distribution of the heat in the chamber $a'$, whereby the ingots $k$ are evenly heated throughout, as is necessary to prepare them properly for subsequent manipulation in the rolls or under the hammer.

I have described the flues $e$ as entering the bridge-flues $c$ in an inclined downward direction. This result is not obtained where the gas is discharged over the bridge-wall through a pipe completely surrounded by the air-draft, because there the combustion takes place in the flues, injuring the walls and producing cutting-drafts, which it is the object of my invention to obviate, as such construction is very much better than one in which the gas-flues extend vertically, for the reason that it tends to accelerate the draft and to discharge the gaseous fluid against the incoming current of air in such a way as to drive the latter away from the upper walls of the bridge-flues, and so extends a more perfect protection to the latter, and at the same time causes both currents to be projected directly against the articles placed on the bed.

My invention is applicable with advantage to all furnaces in which it is desirable to protect the articles in the bed from the cutting effect of the flame.

What I claim as my invention, and desire to secure by Letters Patent, is—

1. The combination, in a furnace having air-heating chambers and a bridge-wall, of hot-air flues leading from the air-heating chambers to the bridge-flues, gas-distributing mains and branch pipes, gas-flues arranged above the air-flues and converging toward the bed, and bridge-flues for receiving the air and gas from their respective flues and delivering them to the bed, substantially as and for the purposes described.

2. In a gas-furnace having gas-pipes, the combination of the gas-pipes with brick discharge-nozzles having sockets for receiving the ends of the pipes, and chambered recesses extending beyond the sides of the sockets and around the pipes for receiving and retaining the packing in place in the nozzles around the pipes, substantially as and for the purposes described.

3. In a gas-furnace, the combination of gas distributing and discharge pipes, with brick nozzles having sockets to receive the ends of the gas-pipes, and expanded or enlarged discharge ends, substantially as and for the purposes described.

In testimony whereof I have hereunto set my hand this 26th day of July, A. D. 1884.

WILLIAM SWINDELL.

Witnesses:
THOMAS B. KERR,
THOMAS W. BAKEWELL.